Aug. 29, 1967

M. J. MAUSOLF 3,338,827

APPARATUS AND METHOD FOR THE PURIFICATION TREATMENT OF LIQUIDS THROUGH FLOCCULATION

Filed March 30, 1966

INVENTOR.
MELVIN J. MAUSOLF
BY Theodore M. Jablon
ATTORNEY.

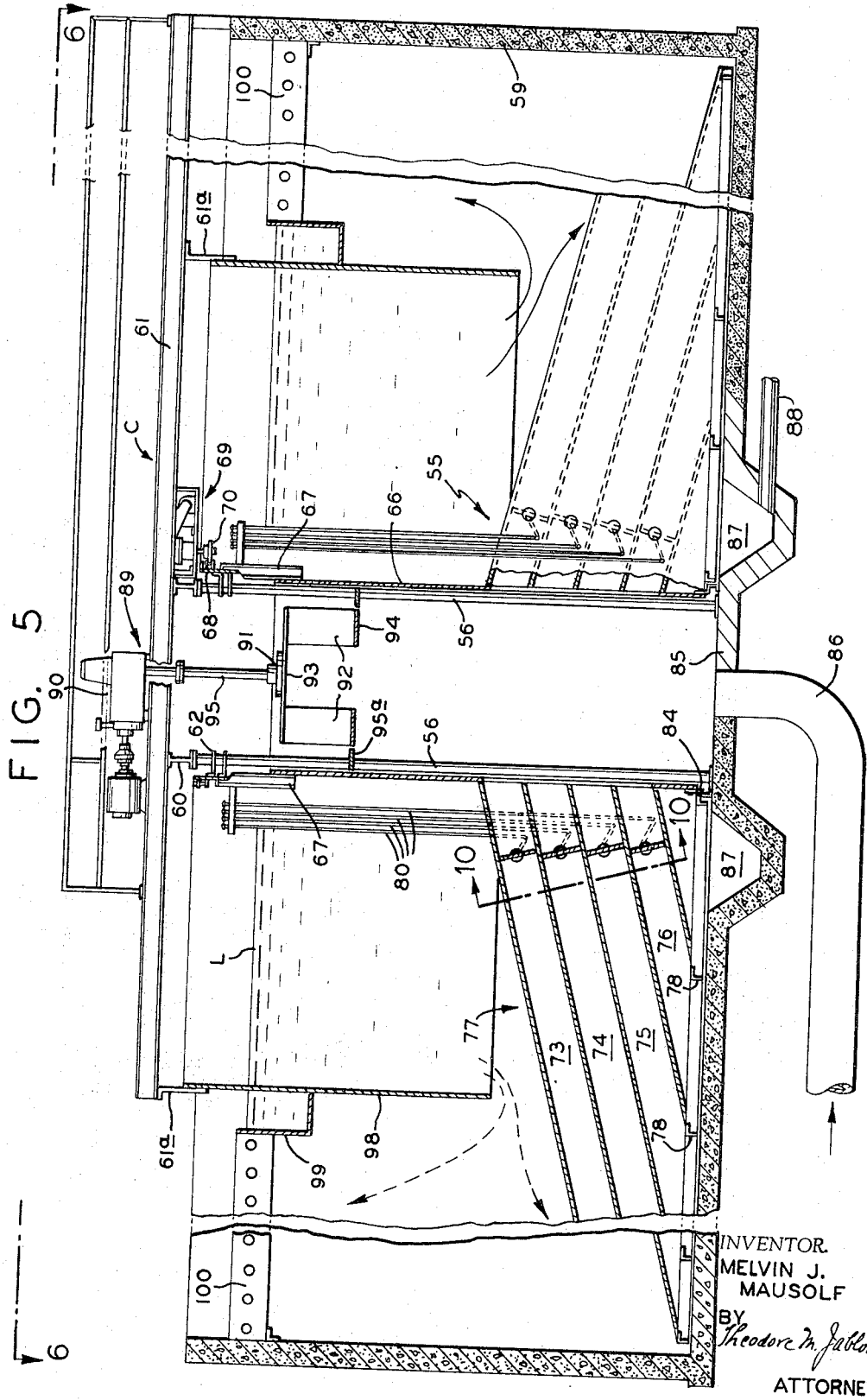

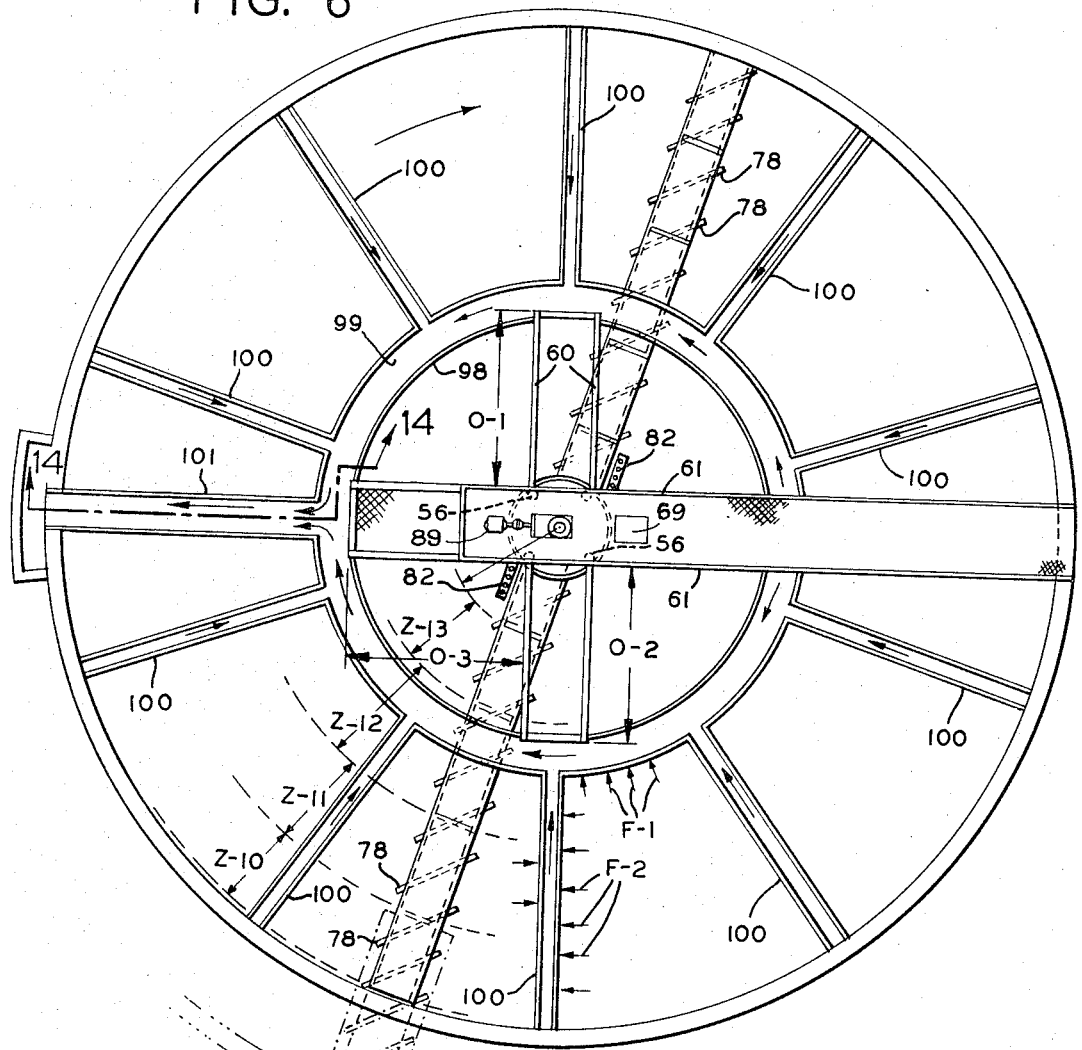
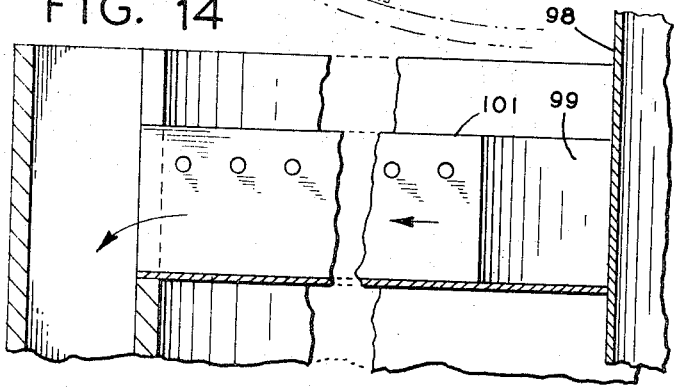

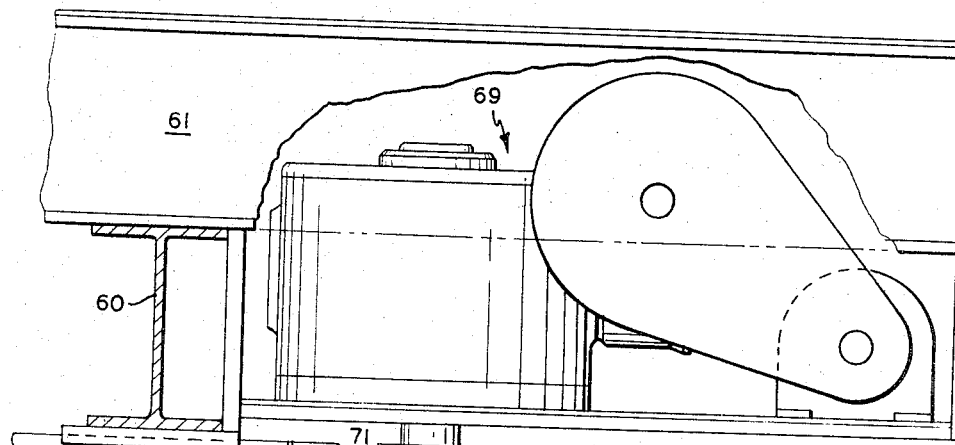
FIG. 8
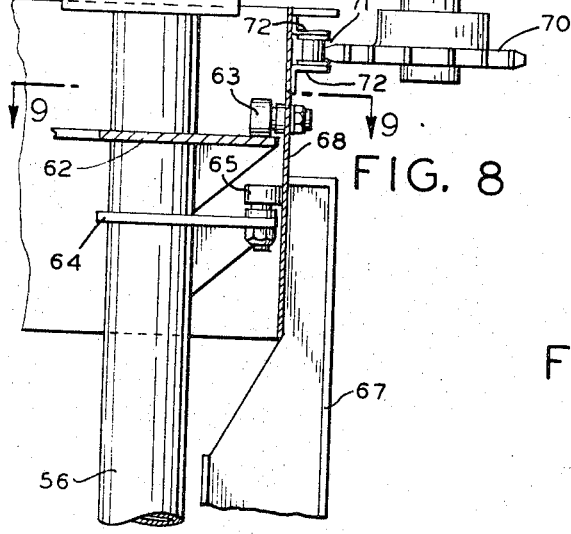
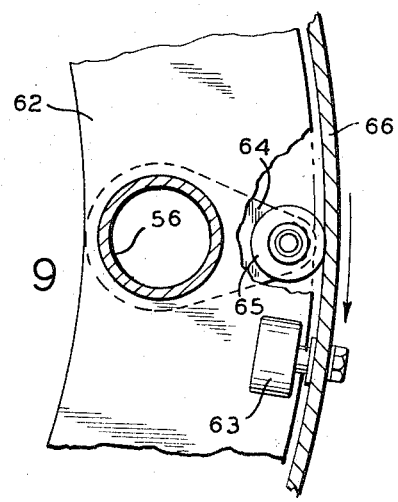
FIG. 9
FIG. 11
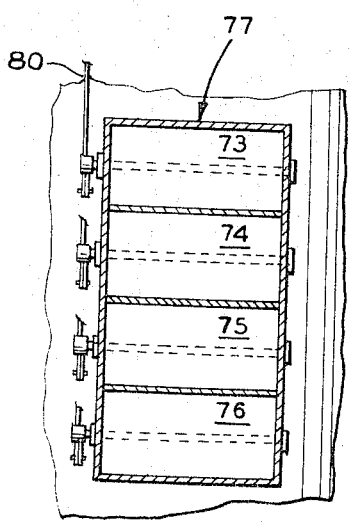
FIG. 10
INVENTOR.
MELVIN J. MAUSOLF
BY Theodore M. Jablon
ATTORNEY.

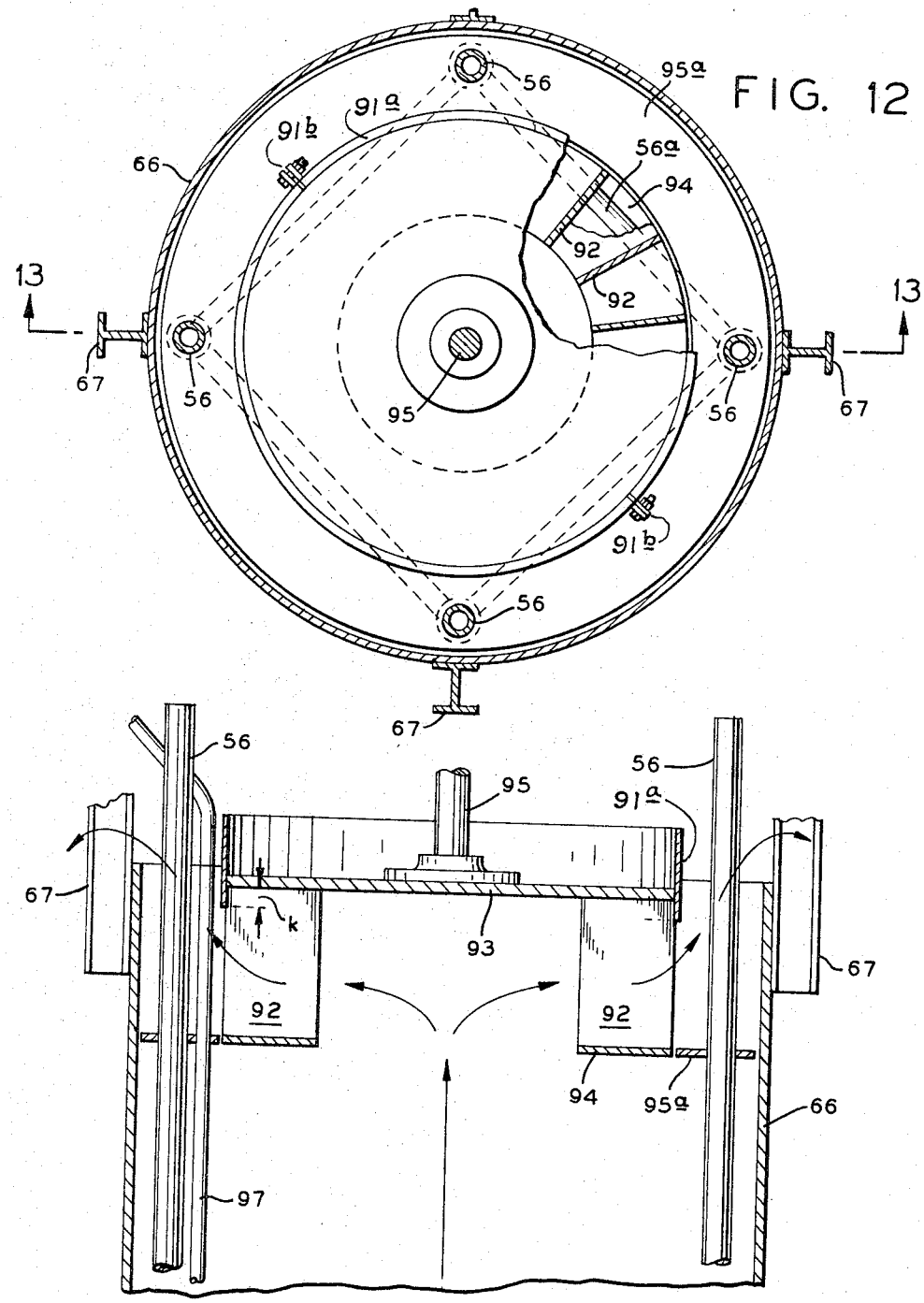

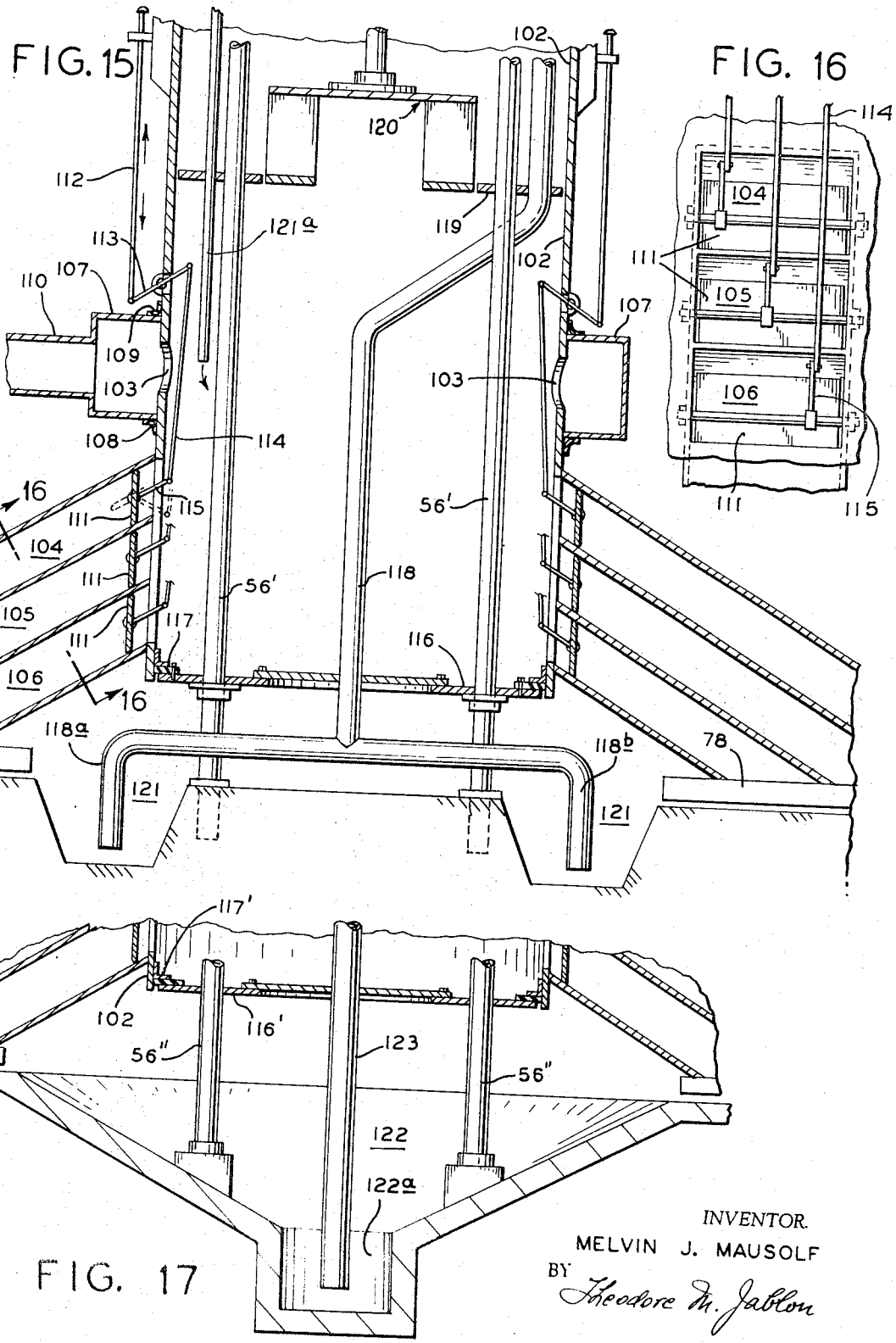

United States Patent Office

3,338,827
Patented Aug. 29, 1967

3,338,827
APPARATUS AND METHOD FOR THE PURIFICATION TREATMENT OF LIQUIDS THROUGH FLOCCULATION
Melvin J. Mausolf, Stamford, Conn., assignor to Dorr-Oliver Incorporated, Stamford, Conn., a corporation of Delaware
Filed Mar. 30, 1966, Ser. No. 538,741
42 Claims. (Cl. 210—46)

This invention relates to the purification treatment of turbid liquids or raw water through flocculation of the suspended solids therein combined with sedimentation of the resulting floc structures in a sludge zone subjacent to a clarified liquid zone.

More particularly, this relates to a continuous operation whereby the functions of flocculation and the subsequent separation of the flocs or sludge are carried out in a single tank or treatment unit which moreover is provided with means for inducing and maintaining internal floc recirculation, that is floc- or sludge recirculation within the tank.

Internal recirculation of flocs or sludge collected at the tank bottom, and re-mixing thereof with the raw water feed in the presence of a coagulating agent, is of itself well known, and is an important practical aspect of treatment here under consideration, inasmuch as the presence of these recirculated flocs will tend to stimulate and accelerate the formation and growth of floc structures.

While the desirability of internal recirculation of sludge or floc structures has previously been recognized, for example in the U.S. patent to Kivell No. 2,669,357, the invention provides improvements whereby special operating conditions particularly conducive to the development of full grown, stable, and well settleable floc structures can be established in the unit, in order that the required detention time and the tank volume, as well as the requirements in chemical conditioning agents be minimized.

Another object is to provide a compact and efficient liquid purification unit that is flexible in design as well as flexible in operation, that is readily adaptable to variations and fluctuation in the various characteristics of the raw water supply, such as the rate of feed, the analysis, as well as type and degree of turbidity in the raw water.

To attain the foregoing objectives the invention in a preferred embodiment of the treatment units proposes recirculating sludge from selected zones into a blending- and contact zone for mingling and reaction with the solids or turbidity of the raw feed in the presence of the coagulating agent. The selective recirculation is so controlled that mainly nuclei and those flocs are recirculated that are still in the initial or intermediate stages of growth, and thus have a relatively high growth potential, in preference to floc structures that have developed to a size where they will no longer benefit from recirculation. Provision is made for promptly eliminating such fully developed floc structures from the internal circuit and from the treatment unit in the form of sludge of maximum concentration. Selective recirculation is so controlled that a floc inventory in the blending- and contact zone is maintainable at an optimum concentration conducive to optimum coagulation of the solids and formation of nuclei and initial flocs. Passing the thus pre-treated mixture through an agitation zone of controllable intensity further conditions the mixture for subsequent flocculation. From this agitation zone the mixture is released into a non-agitated flocculation zone for floc consolidation and growth, and delivery into the body of liquid undergoing sedimentation.

In carrying out the procedure of selective sludge recirculation in a tank with centrally located feed inlet means, the invention takes advantage of the fact that the solids or flocs settle on the tank bottom in concentric zones substantially according to size and weight, with the smaller and lighter flocs settling in the outer zones, and the heavier flocs settling respectively in zones inwardly therefrom.

In view of the above outlined procedure, the invention in a preferred embodiment thereof, provides a rotary structure turnable about a vertical axis in the body of liquid in the tank, and comprising a central vertical cylinder confining an upflow blending- and reaction zone, sludge uptake ducts connected to the cylinder and controllable for selective sludge recirculation into the central blending zone, sludge raking blade means for conveying sludge towards a sump preferably located directly below a flocculation zone formed by a cylindrical baffle wall surrounding a communicating flow passage through which the pre-treated mixture from the blending zone passes from the top end of the cylinder into this flocculation zone and then downward into the surrounding body of liquid undergoing sedimentation.

The lower end of the cylinder is substantially sealed, so that the blending zone may be kept functionally separate from the sludge- or sedimentation zone, enabling upflow-inducing means, preferably in the form of a turbine pumping device effective in the upper portion of the cylinder, to maintain a required rate of selectively controlled recirculation through the uptake ducts.

The action of the turbine pump provides an agitation zone effective between the blending zone and the flocculation zone. Provided the tip speeds of the rotor blades are maintained within a favorable range, this action tends to further condition the mixture which has been pre-treated in the blending zone, for subsequent consolidation in the flocculation zone.

In order that the turbine pump may sustain a required recirculation rate while also producing optimum floc conditioning results, two separate variable control means are provided, whereby the requirements of recirculation may be reconciled with the limitations imposed upon the tip speed of the rotor blades.

Accordingly, provision is made by this invention for a variable speed drive for the rotor to be adjustable relative to a control device which is operable for varying the degree of effectiveness of the rotor blades.

With the rotation of the rake structure, nuclei and underdeveloped flocs on their way towards the sump are diverted upwardly for recirculation through the uptake ducts preferably from selected outer bottom zones, whereas fully developed floc structures may descend from the flocculation zone directly along the cylinder into the sludge collecting zone or sump below. In this way, fully developed descending floc structures along with grit that may be present, will reach the sump directly, and concurrently with those deposited in an annular zone adjacent to the sump, and being conveyed to the sump by the raking blades, unaffected by the diverging path of the recirculating underdeveloped flocs. As a result of such a flow pattern, the developed floc structures are promptly and speedily withdrawable from the collecting zone and from the system, while the requirements in chemical conditioning agents are minimized.

Consolidation and growth of the flocs is also encouraged due to the action of the raking blades conveying them over the tank bottom. Gentle mechanical rake action will cause smaller particles or flocs to combine incrementally into large flocs to be recirculated as and when they reach the opening of an uptake duct, or else to be conveyed into the sump.

The improved treatment unit may be operated economically at a high loading rate in terms of overflow volume per unit of tank area, inasmuch as it produces in its various treatment zones, controllable conditioningand flocculating effects that are cumulative resulting in shorter detention times and minimum tank volume requirements, as well as savings in chemicals.

Other features of the invention are found in various forms of the rotary structure, particularly in the arrangement and construction of the uptake ducts and the recirculation flow control means therefor, also in various arrangements for feeding the raw liquid and withdrawing the sludge, in various arrangements for sealing the bottom end of the rotary structure, and in various support constructions for the rotary structure, as well as in the arrangement of the turbine pump.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

FIG. 5 is a vertical sectional view of the machine similar to the embodiment of FIG. 1, structurally implemented with respect to mounting and details of the rotary duct structure and sludge recirculation control devices.

FIG. 6 is a plan view of the machine taken on line 6—6 of FIG. 5.

FIG. 8 is a still further enlarged detail view taken from FIG. 7 of the mounting and drive arrangement for the rotary duct structure.

FIG. 9 is a cross-sectional view taken on line 9—9 of FIG. 8.

FIG. 10 is a sectional detail view taken on line 10—10 of FIG. 5.

FIG. 11 is a greatly enlarged detail view taken from FIG. 7 of a sealing device for the bottom end of rotary duct structure taken from FIG. 7.

FIG. 12 is a cross-sectional detail view of the rotary structure, taken on line 12—12 in FIG. 7.

FIG. 13 is a vertical sectional view taken on line 13—13 in FIG. 12.

FIG. 14 is an enlarged sectional detail view of an overflow launder arrangement, taken on line 14—14 in FIG. 6.

FIG. 15 is a fragmentary view of the center portion of the rotary structure showing a different arrangement of the raw water feed relative to the rotary structure, along with different means and differently arranged sludge recycle control devices.

FIG. 16 is a detail sectional view taken on line 16—16 in FIG. 15, showing details of the control devices.

FIG. 17 shows a modified arrangement of the sludge withdrawal means.

By way of example, the following description presents various embodiments of the improved liquid purification treatment unit and its operation, as applied to the problems of treating a surface water supply for the purpose of removing its flocculatable turbidity and grit.

Figure 1:
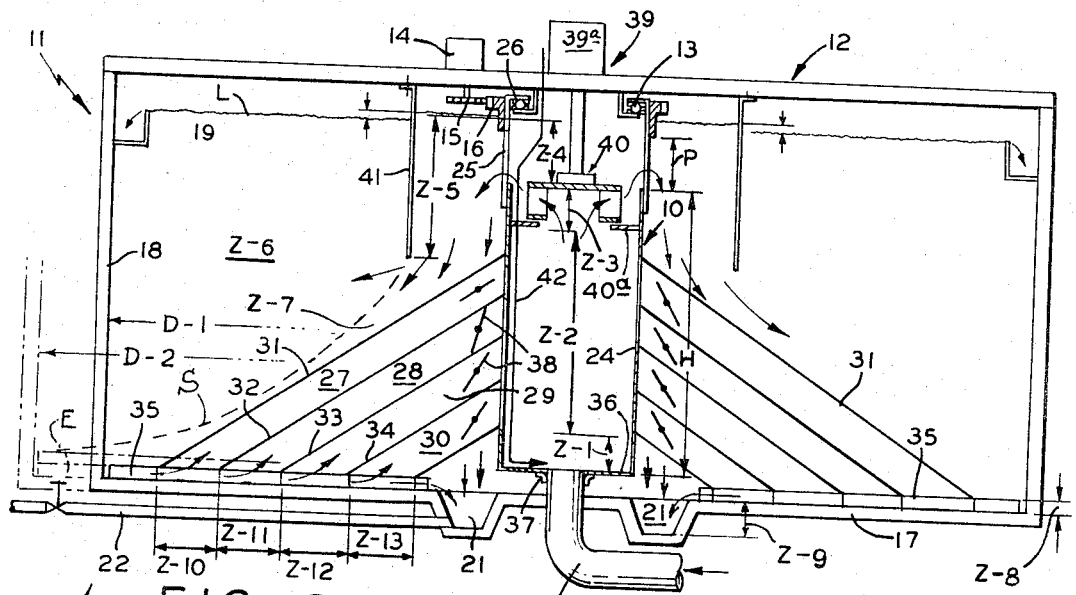
FIG. 1 is a vertical sectional view of the machine, representing a semi-diagrammatic version of one embodiment, featuring zone-wise sludge recirculation through a rotary duct structure.
Figure 3:
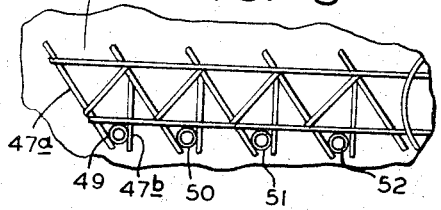
FIG. 3 is a part-sectional cross-section of the rotary duct structure, taken on line 3—3 in FIG. 2.

The semi-diagrammatic view of FIGURE 1 illustrates a principle of the improved apparatus, whereby the flocculation treatment for effecting the purification of the raw water may be carried out efficiently as well as economically, namely in a minimum of tank volume and with a minimum requirement in conditioning or flocculating chemicals such as alum, ferric chloride, etc., and in a manner which is readily adjustable and which is readily controllable for obtaining optimum flocculation results, and which is readily adaptable to fluctuations and variations in the feed rate and other characteristics of the raw water supply.

In the example of FIGURE 1, the treatment unit semi-diagrammatically shown, comprises a rotary duct structure 10 operating in tank 11 which has spanning it a bridge structure 12 supporting the duct structure by means of an annular thrust bearing 13 from which that structure is suspended. A drive unit 14 rotates the duct structure through a drive pinion 15 engaging an external gear 16 fixed to and concentric with the duct structure.

The tank 11 has a flat bottom 17, an upstanding wall 18 with overflow launder means indicated at 19, defining an overflow level L of a body of liquid in the tank. Passing through the center of the tank bottom is a raw feed supply pipe 20 surrounded by an annular sludge sump 21 having a sludge withdrawal conduit 22.

The rotary duct structure comprises a central vertical hollow member or cylinder 24 indicated by its length H having hangers 25 rigidly connecting the cylinder with the external gear 16 as well as with the top ring member or runner 26 of bearing means 13. The spaces between the vertical hangers provide ample communicating flow passage P across the top end of the cylinder from the interior thereof into the body of liquid surrounding it.

The cylinder 24 has a set of sludge uptake ducts 27, 28, 29 and 30 connected rigidly thereto at each side, which ducts communicate with the interior of the cylinder. In this embodiment the set of uptake ducts is in the form of a box girder structure 31 comprising inclined parallel partitions 32, 33 and 34 defining the ducts. Fixed to the open ends of the ducts at the tank bottom are sludge raking blades 35 effective to convey sludge over the tank bottom inwardly toward the sump or sludge collecting zone adjacent to the lower end of the cylinder incident to its rotation. The cylinder has a bottom closure plate 36 through which the raw feed connection communicates with the interior of the cylinder, sealing means 37 being effective between this bottom plate and the feed connection.

The sludge uptake ducts are provided each with a flow control device here indicated in the form of dampers 38 individually and independently operable for each of the ducts.

A turbine type pump unit 39 mounted upon the bridge structure has a variable speed drive unit 39a, and a rotor 40 operating concentrically within the upper end portion of the cylinder, for maintaining internal sludge recirculation through the uptake ducts, and associated with an annular horizontal baffle 40a connected to the cylinder, effective to prevent short-circuiting of the pump capacity.

A stationary cylindrical baffle wall 41 supported from the bridge, concentrically surrounds the top end of the rotary structure 10 and also the communicating flow passage P, so that the pre-treated liquid delivered by the turbine pump will pass radially into and then downwardy through the annular space between this baffle wall 41 and cylinder 24, which annular space represents a non-agitated flocculation zone the function of which will be furthermore explained.

A vertical pipe 42 within the cylinder 24 supplies the conditioning agent or flocculating chemical for mixing with the raw water feed, the mixing zone being at the bottom of the cylinder.

When this treatment unit is in operation with the structure 10 rotated at an appropriate speed, raw water feeds continuously into the cylinder 24 through the bottom end thereof. At the same time, positive upflow movement is imparted to the liquid column in the cylinder by the pump, causing a required recirculating volume of sludge-containing liquid and underdeveloped flocs to be drawn from the tank bottom through the uptake ducts into the cylinder for blending and for interaction with the raw solids of the feed and with the flocculating chemical, such interaction producing nuclei and initial flocs, as well as stimulating the growth of recirculating flocs.

The capacity of the turbine pump is dimensioned so that a large enough and substantially constant total volume is recirculated through the uptake ducts, that is preferably two to four times the rate of raw water feed, providing an adequate floc inventory in the blending zone. With the duct structure 10 rotating, the inlet openings of the uptake ducts ply over respective concentric sludge zones wherein the flocs have settled respectively substantially according to size, the lighter and smaller or substantially underdeveloped flocs being in the outer zones, the heavier and more fully developed flocs being found in the inner zones.

The tip speeds of the rotor blades are preferably kept within a predeterminable optimum range by the use of the variable speed drive unit 39 for the rotor, while compensating adjustment of the pump capacity is available by the provision of suitable devices whereby the pumping effectiveness of the rotor blades may increase or decrease at will, an example of which will be described below.

Figure 4:
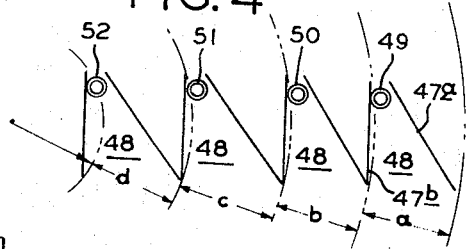
FIG. 4 is a diagrammatized version of FIG. 3.
Figure 2:
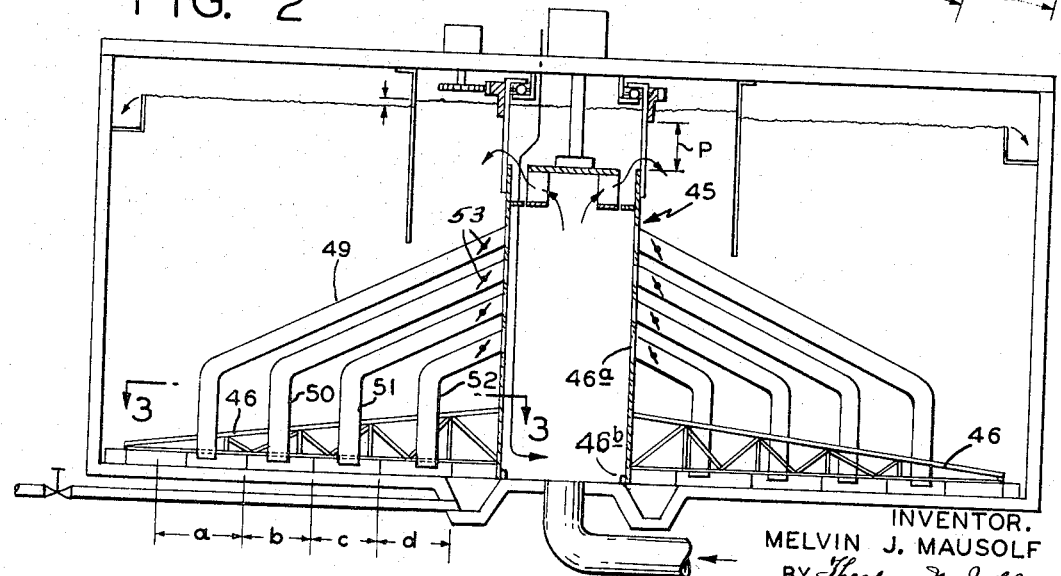
FIG. 2 is a similar semi-diagrammatic version of the machine illustrating a rotary duct structure of different construction.

The treatment unit in FIG. 2, while semidiagrammatically similar to FIG. 1, illustrates a modified form of the rotary duct structure, designated as a whole by numeral 45. While similar in principle, and function, this duct structure differs from the one in FIG. 1 in that rake arms 46 are rigidly connected to the lower end portion of the central vertical cylinder 46a, and pairs of converging raking blades 47a and 47b forms a V-shaped sludge pocket 48 open at the narrow end. A series of such sludge pockets along the arm thus defines corresponding concentric sludge uptake zones (a), (b), (c), (d) diagrammatically shown in FIG. 4. Individual sludge uptake pipes 49, 50, 51, 52 extend from the narrow or vortex ends of respective sludge pockets and from respective sludge take-up zones (see FIGS. 2 and 4), to the cylinder 46a, for selective recirculation of sludge from respective sludge take-up zones into the Blending-, Contact-, and Reaction Zone inside the cylinder. Selective recirculation is available by way of individual adjustment of flow controlling damper devices 53 or the like, associated with respective uptake pipes. An annular sealing means 46b is effective between the lower end of the cylinder and the tank bottom.

A preferred form of the treatment unit according to the invention, is illustrated in FIGS. 5 to 14, more fully implemented and detailed.

In that embodiment, a rotary duct structure 55 is mounted for rotation upon a vertical support structure comprising a plurality of posts 56 spaced evenly around the vertical axis of rotation, and rigidly interconnected to one another by bracing indicated at 56a and rising from the tank bottom 85 within the central hollow portion of the duct structure. A radially extending partial bridge or beam construction C connects the top end of the vertical support structure with the wall 59 of the tank.

Upon the top end of the four posts 56 according to FIGS. 6 and 12 they are mounted on a first pair of parallel beams 60 which have overhanging end portions O-1 and O-2 of equal length (see FIG. 6). Across these beams and mounted thereon is another pair of parallel beams 61 constituting the partial bridge itself, which second pair of beams have an overhanging end portion O-3 of a length equal to that of the overhanging portions O-1 and O-2 of the first pair of beams.

A horizontal annular shelf 62 is mounted upon the top end portions of the posts concentric with the axis of rotation of the duct structure, and providing an annular operating track for support rollers 63 mounted internally upon the top end of the center portion of the duct structure. Each of the posts further has fixed thereon a bracket 64, each bracket carrying the radial guide roller 65 internally engaging the duct structure.

The hollow center portion of the duct structure comprises a cylinder 66 indicated by its height H-1, and which is submerged, for example, a distance "(d)" below the overflow level L of the liquid body in the tank. The top end of this cylinder is rigidly connected through vertical hangers or connector members 67 to an auxiliary cylindrical member 68, indicated by its height H-2, and having internally mounted thereon the aforementioned track rollers 63, while also providing annular internal track surface engaged by the aforementioned radial guide rollers 65. The vertical distance between the top edge of the cylinder and the bottom edge of part 68 provides the communicating flow passage indicated by P-1 through which the pre-treated liquid rising in the cylinder flows radially outwardly in all directions into the surrounding flocculation zone.

The duct structure is rotated by a variable speed drive unit 69 mounted on the aforementioned beam construction or bridge, and having a drive sprocket 70 mounted on a vertical downwardly projecting shaft, in driving engagement with an endless chain element 71 closely surrounding the member 68 of the duct structure, and fixed thereto as indicated by brackets 72.

Figure 7:
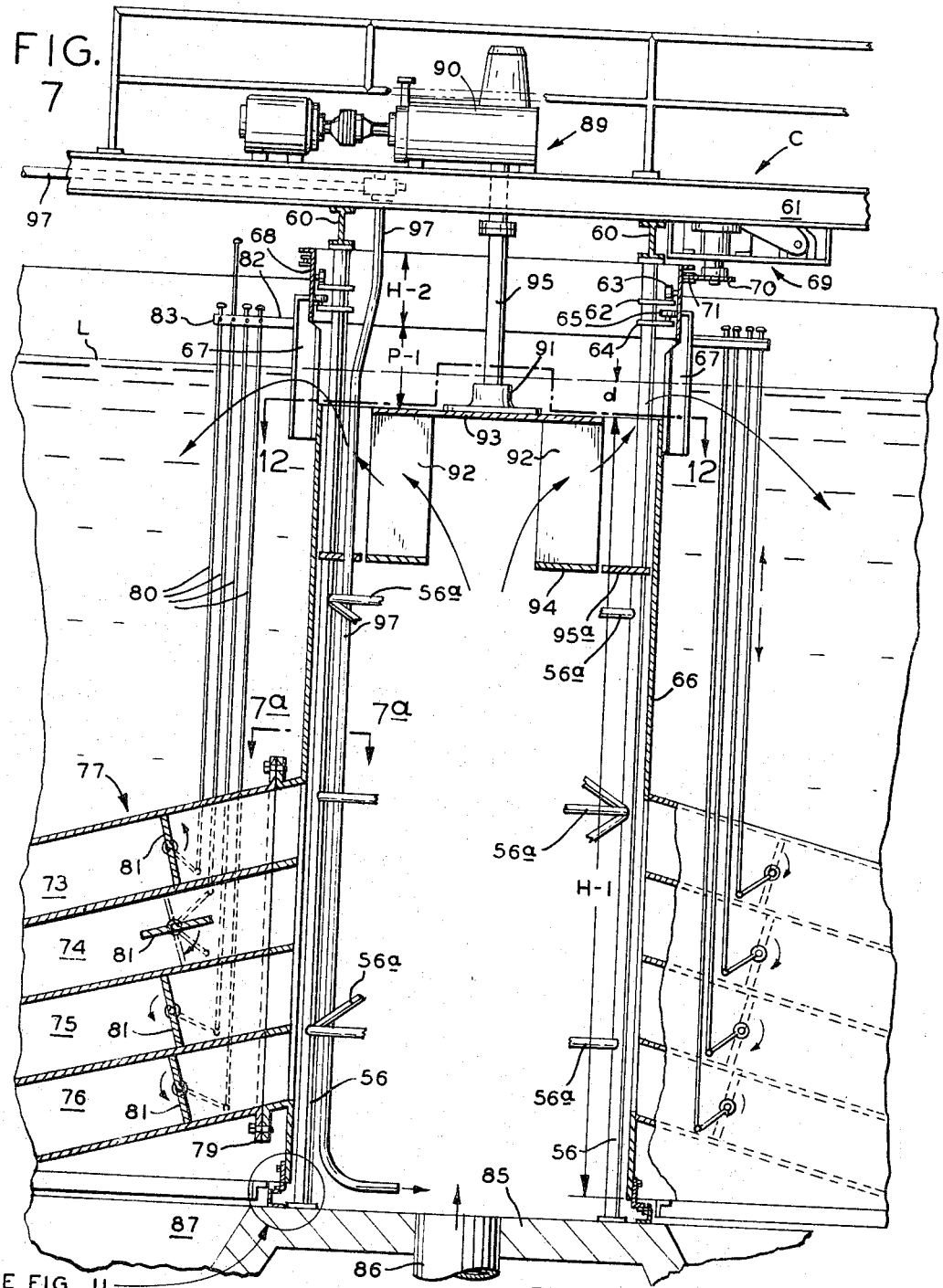
FIG. 7 is a further enlarged fragmentary view of the central portion of FIG. 5, more clearly showing the construction.
Figure 7A:
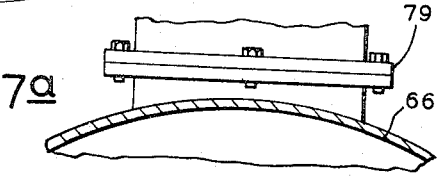
FIG. 7a is a detail cros-sectional view taken on line 7a—7a in FIG. 7.

The cylinder 66 carries sloping sludge uptake ducts (73, 74, 75, 76) provided in the form of a box girder construction 77 in principle similar to the one described above in FIG. 1, except for the showing of a vertical flange connection 79 (see FIGS. 7 and 7a), and the provision of vertical manually operated actuating rods 80 for setting respective flow controlling dampers 81 provided in the respective uptake ducts. The actuating rods are guided in a bracket 82 provided with set screws 83 for fixing the adjusted positions of the rods. Suitable calibrated means for indicating the position of the dampers may be provided, but are not shown. Sludge raking blades 78 are fixed to the underside of the box girder construction.

An annular sealing device 84 (see FIG. 7 and detail FIG. 11) is effective between the lower end of the cylinder 66 and the tank bottom 85, surrounding a bottom area through which raw feed water enters the cylinder by way of a supply pipe 86. An annular sludge sump 87 provides the sludge collecting zone for the sludge conveyed thereto by the raking blades and adapted to be withdrawn therefrom at a controlled rate through discharge pipe 88.

A turbine type pump unit 89 is mounted upon the aforementioned beam construction or bridge, comprising a variable speed drive unit 90 and a depending rotor structure 91. Vertical radially directed rotor blades 92 are fixed to a circular top plate 93 and to an annular bottom plate 94, the top plate in turn being concentrically connected to rotor shaft 95. A horizontal stationary annular baffle plate 95a fixed to the posts is associated with the rotor structure, to prevent short-circuiting. The posts extend through this baffle plate, and so does a chemical supply pipe 97.

As illustrated in FIGS. 12 and 13, means are provided for varying and adjusting the capacity of the turbine pump. According to this example, such adjusting means may comprise a cylindrical member or annular band 91a clamped around the rotor as indicated by clamping connections 91b. The member is thus vertically adjustable in a manner to blank-off a desired portion of the rotor blades, here indicated for example by the distance "k."

A cylindrical baffle wall 98 surrounding the upper central portion of the duct structure concentric therewith, provides the flocculation zone for the liquid which has been pre-treated in the cylinder, which pretreated liquid is delivered by the turbine pump over the top edge of the cylinder into the ample annular flocculation space between the cylinder and the surrounding baffle wall. The baffle wall is suspended from the aforementioned two pairs 60 and 61 of parallel beams, as indicated by suspension brackets 61a.

A spider-like system of overflow launders for the clarified liquid in this embodiment comprises a central annular launder 99 surrounding the cylindrical baffle wall 98, and radial launders 100 the inner ends of which communicate with the annular launder, while the outer ends adjoining the tank wall are closed. Clarified liquid (see FIG. 6) overflows both into the annular launder (see flow arrows F–1) and into the radial launders (see flow arrow F–2). The overflow liquid from the radial launders gravitates to the lower level of the annular launder and from there out of the system via the radial discharge launder 101.

Since the detention time and corresponding tank volume requirements may vary for a given size and design of the rotary duct structure, an accommodation is indicated in dot-and-dash (see FIGS. 1 and 6) by showing (in dot-and-dash) an increase of the tank diameter from D–1 to D–2, and a corresponding rake arm extension E.

Another embodiment according to the invention, as shown in FIGS. 15 and 16, differs from the ones above described, in that it avoids having the raw water feed duct and the sludge discharge duct located underground or underneath the tank bottom. Accordingly, in this embodiment, the center portion of the rotary duct structure comprises a cylinder 102 having lateral raw water feed inlet openings 103, located in a horizontal feed inlet zone closely above the uppermost of the sludge uptake ducts here shown in fragmentary fashion at 104, 105, and 106. Raw water feed supply to the openings is provided by a stationary annular inwardly open duct 107 closely surrounding the rotary cylinder in sealing relationship therewith as indicated by annular sealing means or sealing rings 108 and 109, with a radial supply duct 110 connected to the annular duct. Suitable suspension means for these raw feed ducts may derive support from the beams 60 and 61 of the super structure, but are here not particularly shown.

Individually operable flow control means to control sludge recirculation through the uptake ducts again are in the form of dampers 111 or the like, although actuated by rods and linkage means differing from those previously shown, in that they extend at least partially within the cylinder, that is within the area surrounded by the annular duct.

Accordingly, these actuating means for each of the dampers comprise a first vertical rod 112 mounted upon the outside of the cylinder, and having its lower end pivotally connected to one end of a double armed lever 113 mounted upon the cylinder for swinging movement in a vertical plane and about a horizontal axis. A second vertical rod 114 located below connects the other arm of the lever with an arm 115 fixed to the damper 111, which latter arms are located internally of respective uptake ducts. Therefore, pushing down on the rod 112 will tend to close, while pulling upwardly on the rod will open, the respective damper. The upper end portion of the sludge withdrawal pipe may be in the nature of a siphon pumping arrangement or the like here not shown.

Supporting means in the nature of supporting posts 115, as well as other adjuncts for the rotary duct structure in this embodiment, may be similar to those shown and described above. However, the cylinder is closed here by a bottom plate 116 mounted upon posts 56′ the closure plate being spaced upwardly from the tank bottom, and having peripheral sealing relationship with the lower edge portion of the cylinder as through a sealing device indicated at 117.

A sludge withdrawal pipe 118 located within the cylinder extends through the bottom plate 116 as well as through an annular horizontal baffle plate 119 surrounding the turbine rotor 120, similar to the one described above in connection with FIG. 7. The lower end of the sludge withdrawal pipe has at least two symmetrically arranged terminal uptake branches 118a and 118b depending into an annular sludge sump 121. A pipe 121a indicates the supply of a chemical conditioning agent into the blending-, contact-, and reaction zone.

In FIG. 17 as a modification of FIG. 16, the annular sludge sump is replaced by a central sump 122 having a relatively deep sludge pocket 122a into which extends a sludge withdrawal pipe 123.

It should be understood that the flow control devices for the sludge uptake ducts, herein exemplified by dampers or the like individually operable as by shifting respective actuating rods, are capable of various modifications. For instance, they could be provided in the form of hinged or vertically slidable gates mounted internally of cylinder 66 of the duct structure, and at the very inner end of the respective ducts.

The actuating means for these flow control devices also may assume different forms. For instance, even though shown to be individually and independently operable, they could be provided with means or with an interlocking device whereby the dampers or gates could be moved in a compensatory fashion, that is more or less in such a manner that, as the innermost uptake ducts are closed the outer ducts are correspondingly opened and vice versa.

In describing the operation, reference may be had to the treatment unit indicated as having the larger tank diameter D–2. As the rake arm extensions E in that unit convey the light sludge from the outlying bottom zone inwardly, they cause the light and small flocs therein to consolidate into somewhat larger flocs until they come under the influence of the first sludge uptake zone where intensified and controlled floc build-up may begin. Such floc build-up is the result of the operation of a sequence of treatment zones Z–1 through Z–13 maintainable in the treatment unit according to the invention, and diagrammatically illustrated in FIG. 1 and featuring the selectively controllable zone-wise sludge recirculation whereby optimum floc concentrations are maintainable in respective treatment zones.

The operating- and treatment zones thus discernible are designated as follows:

Z–1—Mixing zone.
Z–2—Blending-, contact- and reaction zone.
Z–3—Agitation zone.
Z–4, Z–5—Flocculation zone.
Z–6—Clarified liquid zone.
Z–7—Sludge zone (as defined against the clarified liquid zone).
Z–8—Sludge collecting zone.
Z–9—Sludge collecting- and withdrawal zone.
Z–10 to Z–13—Sludge uptake zones.

Controllable factors operable for maintaining optimum conditions in the foregoing operating zones, are as follows:

(1) Chemical dosing rate.
(2) Turbine pump capacity, controllable for establishing a required upflow velocity in the central upflow treatment zone of the duct structure, and a required total recirculation rate.
(3) Turbine blade tip speed, controllable for maintaining optimum floc agitation effects in the agitation zone of the pump.
(4) Selective zone-wise sludge recirculation, controllable for establishing and maintaining a required floc inventory in the central upflow blending and contact zone.
(5) Rate of sludge withdrawal from the sludge collecting zone or sump.

For purposes of this invention the turbine pump may have a pumping capacity preferably in a range from about 2 to about 5 times the rate of raw feed supply to the treatment unit, with a blade tip speed such as will be further conducive to the formation of well developed and shear-resistant flocs in the subsequent flocculation zone.

The blade tip speed at best should not fall either below or above an optimum range such as will be conducive towards providing good flocculation, yet it should not be so high as to have excessive and destructive shearing action on the flocs.

The pump capacity once determined or adjusted is constant, and effective to draw a constant total volume of sludge and/or liquid through whatever sludge uptake ducts are either partially or fully open. Where the pump capacity provides for a total recirculation of about 4 to 5 times the rate of the raw water feed supply, moderate fluctuations in the volume of the supply may be absorbed without significant effect upon the operation as a whole.

In describing the start of the operation of the treatment unit, it may be assumed that the pump capacity and the blade tip speed have the anticipated correct magnitude for a given rate of supply of raw feed water of predetermined characteristics, with the duct structure itself being rotated at a low speed. Within that environment it is necessary to build up an adequate sludge inventory in the sludge zone Z–7, as well as an adequate inventory of flocs in transit upwardly through cylinder 66, which latter inventory should contain a predominance of semi- or under-developed flocs since they will have a high growth potential which becomes effective as such in the course of recirculation.

The start-up period of the operation would begin by closing the sludge discharge from the sump, or by limiting the discharge so that only sand or silt are being delivered. Also, the outer half of the uptake ducts, or else all except the innermost uptake ducts, are closed in order that only the densest and well settling floc particles are being recirculated. But, as the inventory of sludge accumulates in the system, and the density of floc concentration increases to the extent desired, then recirculation would gradually be shifted to the outer ducts by manipulation of the flow control devices, in order that the rate of recirculation of finer floc particles and more dilute sludge may be slowly increased until the system approaches optimum operating conditions.

Next, the rate of wasting sludge from the system would be increased, but so controlled that a good dense sludge be discharged from the sump.

With the pumping capacity and the rotor tip speed established for a given rate of supply of raw feed water of given characteristics, and with the duct structure rotating at a low speed, optimum conditions are attainable by circulating a sludge from those zones that will supply a preponderance of flocs that have not yet attained their full development, and therefore will have a relatively high growth potential to be economically exploited when subjected to recirculation and to the effect of the flocculating chemical. This zone-wise sludge recirculation is furthermore so controlled as to have optimum floc concentration maintained in the blending-, contact-, and reaction zone Z–2.

In the initial zone Z–1 raw water mixes with the reagent solution or flocculating chemical, at which point the control of the dosing rate is important for economically attaining optimum conditioning and flocculating effects in the subsequent treatment zones.

Next, in treatment zone Z–2, with proper control by selective zone-wise sludge recirculation, there are provided optimum conditions for interaction and intermixing of the reagent solution with the recirculating flocs and with the raw water impurities. The conditions prevailing in this zone are conducive to incremental floc build-up and to the rapid formation of larger, denser, and more shear-resisting floc structures. Due to the coagulating effect of the chemical which may be alum, ferric chloride, etc., the small floc particles are caused to adhere to larger floc structures. When these floc structures, in the course of sustained recirculation and under supervised controlled conditions, will have attained their maximum practical size, they will be eliminated promptly from the circuit as a result of the flow pattern within the unit.

From zone Z–2 the thus pre-treated mixture passes through the turbine agitation zone Z–3 wherein under properly adjusted conditions of flow velocity and rotor tip speed, there are imparted to the mixture a relatively mild agitation, as well as acceleration, thereby producing a conditioning action which further encourages particle contact resulting in further floc consolidation and growth in a subsequent flocculation zone Z–4 and Z–5.

Accordingly, then the thus conditioned floc-laden mixture decelerates as it enters the non-agitated flocculation zones Z–4 and Z–5 providing the environment for further floc consolidation and growth to become effective. The downwardly directed flow of the flocculated mixture from this zone causes fully developed dense flocs in the mixture, having no further growth potential, as well as gritty matter that may be present and carried along with the flocs, to descend directly into the annular sump below, whence they may be promptly removed from the circuit and from the system.

In this way, those floc structures and solids reachnig the sump in a substantially direct downward path, are not kept in circulation long enough to interfere with the formation and growth of newly forming flocs in the circuits, and particularly in the central upflow treatment zone. In this way also, the more quickly the full grown floc structures are thus removed, the more effectively is the available pump capacity utilized for selectively recirculating those underdeveloped flocs still having considerable growth potential in the presence of other particles and of the conditioning chemical. Moreover, such rapid removal avoids loss of reagent solution in the flocs that have no further growth potential.

The next following clarification and sludge sedimentation zone defined by the annular area between the cylindrical baffle wall 41 and the depth of the tank represents a required detention capacity which is minimized by the flocculation efficiency of this invention.

With proper adjustments and supervised operation of zones Z–1 to Z–5, that is from chemical dosing through flocculation, there follows rapid separation of the mixture into the clarified liquid zone Z–6 and the subjacent sludge zone Z–7.

In this way, separated clear water rises to the overflow launder, while a large floc inventory of high average concentration develops in the sludge zone Z–7 which then may be definable by a contour line S extending from the lower edge of the cylindrical baffle wall downward and outward to the periphery of the tank. This break along the contour line S between the clarified liquid and the sludge may be clearly visible under conditions maintainable when the operation is conducted and controlled in accordance with the invention.

In the raking zone Z–8 sludge is moved steadily inwardly towards the sump by the rotation of the duct structure and the action of the raking blades, with sludge being picked up from selected zones at the selected rate, thus to be diverted through the uptake ducts into the central upflow treatment zone. However, those well developed heavier flocs that have settled in a zone adjacent to the sump, or else flocs having grown sufficiently while in transit from the outer to the inner zones are thus delivered into the sump, joining those having descended directly from the flocculation zone above, so that most of the flocs which have substantially no further growth potential left, are thus removed promptly from the circuit and from the sump through the sludge withdrawal conduit 22.

In this way, it may be said that an optimum operating balance is attained in the system when zone-wise sludge recirculation and other pertinent factors are so adjusted that no flocs at all need be recirculated from the zone adjacent to the sump, while fully developed floc structures are collected and delivered rapidly into the sump both horizontally from the tank bottom and vertically from the flocculation zone. At the same time, sludge from the more outlying or intermediate zones is diverted upwardly for recirculation along paths diverging upwardly and inwardly from the path of the flocs being conveyed over the bottom towards the sump.

Following is a tabulation of the main Operating Factors along with their respective tentative controllable Operating Ranges, substantially applicable to this invention:

(1) *Maximum turbine pump capacity.*—Up to 5 times the rate of raw feed water supply.

(2) *Tank overflow capacity.*—From about 1 to about 2 gallons per minute per square foot or 1440 to 2880 gallons per day per square foot, depending upon raw water characteristics.

(3) *Detention time of the raw water in the tank.*—1 to 2 hours.

While the foregoing operating ranges may serve as a projection for the design and operation of the treatment unit, aided by routine tests on the raw water, supervision of the operation itself may be had by observation of the sludge contour line S, as well as by way of test samples taken of the pre-treated and conditioned mixture from the flocculating zone within the cylindrical baffle wall.

Consequently, various control correctives or adjustments based on the taking of representative samples are available in order that currently the desired operating conditions be maintained.

Various suitable corrective measures that may be called for, are as follows:

A. *Corrective for improving flocculation.*—If for a given pumping capacity the rotor speed or tip speed be found too slow for obtaining good flocculation, a correction is attainable as follows: Reduce the discharge capacity or pumping effectiveness of the rotor, for instance by downward adjustment of the blank-off sleeve 91a, and then compensating for such adjustment by increasing the speed of rotation of the rotor until the original pumping capacity will have been restored. In order to correct overadjustment, the rotor speed could be again reduced slightly and/or the sleeve be backed off slightly so that less discharge area is closed off and rendered ineffective. If good coagulation and flocculation have thus been obtained, then only the desired density or floc concentration of the mixture in the central upflow treatment zone need be supervised and maintained.

B. *Corrective against floc destruction.*—If it be found that the floc formation is not as good as should be expected, and that the more fragile floc particles are being destroyed as by excessive shearing action of the rotor blades, correction is attainable as follows: Reduce the speed of the rotor, which in turn reduces blade tip speed, providing more gentle agitating effects upon the flocs. However, since this also reduces the pumping capacity, it is compensated for by opening, to whatever degree is necessary, the inner uptake ducts, so as to bring a more concentrated sludge into recirculation, thereby maintaining the desired floc density in the central upflow zone. At the same time, the outer uptake ducts would be closed sufficiently in order to reduce or minimize the return of dilute sludge.

First, adjustment is made for increasing the flow through the inner uptake duct or ducts, the ones that are recirculating the then densest sludge to the central upflow treatment zone. Thereupon, if the sludge drawn from the sump is found to be too watery, this may require the sludge discharge rate from the sump to be throttled down sufficiently to attain a desired discharge concentration.

Furthermore, if necessary, the flow through the outer uptake ducts may be restricted by manipulating the flow control devices, thereby reducing the rate at which thin or watery sludge is being recirculated. The thin sludge that is not diverted through the uptake pipes due to this adjustment will then be rolled gently by the raking blades over the tank bottom and due to such conveyance will be thickened until it reaches the zone of influence of the first uptake duct which diverts the thus preliminarily thickened sludge for recirculation. Again, any further over-correction may be taken care of by small readjustments.

C. *Corrective against too high a density in the central upflow treatment zone.*—If a representative sample taken from the flocculation zone should indicate that the concentration of the floc mixture is too high, or contains too many fully developed floc structures qualified for prompt removal from the system, correction is attainable as follows: The first step is to make adjustment for reducing the flow through the inner uptake duct or ducts, the ones that are recirculating the then densest sludge through the central upflow treatment zone. Consequently, this may require the sludge discharge rate to be adjusted so as to ensure that sludge is eliminated from the circuit in proportion to the new rate at which sludge is accumulated and thickened in the sump. If need be for further reduction in floc concentration, then the flow through the other uptake duct or ducts may be increased accordingly by manipulating the respective flow controls. any over-adjustment may be re-corrected until the desired operating balance is obtained.

D. *Corrective against too low a density in the recirculating floc mixture.*—If a representative sample taken from the flocculation zone should indicate that the concentration of the floc mixture is too low, correction is attainable as follows:

Summary

An important requirement in the design and operation of the treatment units according to this invention, is to maintain in the central upflow treatment zone Z-2 a high concentration of suspended solids, in order to have available in that zone a multitude of particles or flocs to act as a nuclei in the formation of larger, denser and relatively rugged and shear-resistant flocs capable of adsorbing other small and possibly more fragile flocs, and eventually thus forming well developed floc structures that will separate and settle readily from the water in the clarification zone.

In this connection, it may be said that, as in any chemical reaction an excess of reagents on one side of the equation will drive the reaction to completion, so in the operation of this invention will coagulation and adsorption and floc build-up be carried out much faster in an environment containing a large excess of previously formed flocs.

Accordingly, the invention aims to maintain the highest solids and floc concentration practically possible in the central upflow treatment zone, yet not so high as to create undue head loss in the uptake ducts because of too high a specific gravity and/or density of the recycling sludge. Once the Optimum solids concentration is established for carrying out the coagulation reaction to a prompt and satisfactory completion, then it is only necessary to maintain this condition by observing the above described supervision and controls.

From the central upflow treatment zone the floc suspension or pre-treated floc mixture passes upwardly through the turbine pump where the flocs must withstand the shearing forces of the rotor so they will not be destroyed, for instance at a normally desired rotor tip velocity of about 5 ft. per second. However, some floc particles in the mixture being more fragile than others, may not be able to withstand the effects of this tip velocity. Therefore, the rotor or impeller is designed for flexibility in the sense that within suitable limits the pump capacity may be increased to compensate for a lowering of the tip velocity, and vice versa. The combination of variable rotor blank-off means with a variable speed drive mechanism, will provide that flexibility.

Another corrective is available to compensate for a lowering of the tip speed, namely the zone-wise sludge recirculation control whereby the recirculation may be shifted from one zone to another, or else from lighter sludge to denser sludge pickup and vice versa. For practical conditions, therefore, the rotor is preferably designed for a miximum tip speed of about 5 ft. per second, and for a maximum pumping capacity of 500% of the design capacity of the treatment unit, that is when the adjustable area of the impeller is fully open. Enough margin is thus available for applying the above described corrective measures.

Whent he rotor tip speed is to be reduced because of floc-shearing effects from the impeller with consequent reduction in the amount of flocs being recirculated, such reduction of floc recirculation may be compensated for by shifting the recirculation of large and denser flocs drawn from the more inwardly located sludge zones of higher or highest density. Additional compensation derives from the fact that when the flow through the extreme outer uptake duct or ducts are throttled, then those very light and vulnerable particles settled in the outlying zones will be caused to gently roll over the tank bottom by the raking blades, thus contacting and absorbing other fine particles to integrate them into floc structures. Eventually, when these particles and flocs reach the zone of influence of an open uptake pipe they will be diverted upwardly and recycled into the central upflow treatment zone. At the same time, those particles having high specific gravities or particles too massive to be lifted and carried along by the divergent recirculation flows, will continue to be moved over the tank bottom by the blades until they reach the sump and thus are purged from the system as concentrated sludge.

Large amounts of heavy silt or sand may enter the system through the influent pipe, which after one pass through the turbine pump may settle on the tank bottom in a zone around and adjacent to the sump. Although recirculating these solids is feasible, keeping these particles in the circuit would have no beneficial effects upon the desired floc forming conditions to be maintained in the central upflow treatment zone. Therefore, it is best to purge these solids from the system as by throttling or closing the innermost uptake circulation duct, while allowing the raking blades to move the material from this inner zone directly into the sump whence it is purged from the system.

In that instance, the pumping capacity would be satisfied by the circulating flows through the outer and the intermediate uptake ducts. Adjustment of these flows will be such that into the upflow treatment zone there is delivered a volume and a type of sludge that is conducive to maintaining in that zone optimum solids and floc concentration for best possible reaction between the raw water, the recirculating slurry, and the chemicals acting towards the rapid formation, consolidation, and growth of flocs.

From the foregoing it will be seen that the treatment system according to this invention features adjustments of impeller speed and of impeller discharge area, combined with control means providing an infinite variety of locations from which respective types of sludge may be drawn and recycled to create an optimum or perfect environment for sustaining a speedy and economical coagulation reaction and flocculation. As a result, there are formed readily settleable flocs requiring minimum tank volume and detention time. Furthermore, sludge recirculation is conducted along inwardly directed paths diverging upwardly from the bottom, allowing heavy solids and/or floc structures free to continue their movement over the tank bottom, and eventually to join the path of the vertically descending solids from the flocculation zone, both for prompt elimination from the circuit and from the sump.

It will be understood that each of the elements, or two or more together, of the apparatus herein described, may also find useful application in liquid purification treatment systems differing from the one described above.

Furthermore, while the invention has been illustrated and described as embodied in a treatment apparatus employing a rotary duct structure for sludge recirculation and turbine type circulating pump cooperating therewith, it is not intended to be limited to the details shown, since various modifications and structural changes may be made without departing from the spirit of the present invention.

I claim:

1. Apparatus for the purification treatment of liquids through flocculation of the suspended solids therein, and sedimentation of the resulting flocs in a sludge zone subjacent to a clarified liquid zone, which comprises a tank having overflow means for said clarified liquid, and sludge withdrawal means; a rotary structure turnable about a vertical axis in the body of liquid in the tank, comprising a central vertical hollow member having a top end portion providing communicating flow passage therefrom into the surrounding body of liquid; bearing means supporting said hollow member for rotation about said vertical axis; support structure for said bearing means; sediment conveying means carried by said hollow member for moving sludge over the tank bottom to a sludge collecting zone cooperating with said sludge withdrawal means; sludge recirculating duct means extending outwardly from said hollow member, providing flow passage from at least one predetermined portion of said sludge zone into said hollow member; upflow inducing means effective within said hollow member; closure means for the lower end portion of said hollow member, effective to substantially prevent passage of sludge through said lower end; supply means for feeding liquid to be treated into said hollow member for blending and pre-treating with the recirculating sludge in the presence of a flocculating agent; a baffle wall surrounding said communicating passage, and dimensioned and arranged so as to provide therein a supplemental flocculation zone for the pre-treated mixture passing downwardly therethrough, into the surrounding body of liquid undergoing sedimentation; and drive means for rotating said rotary structure.

2. The apparatus according to claim 1, wherein said sludge collecting zone is located adjacent to said hollow member.

3. The apparatus according to claim 1, wherein said flow inducing means is in the form of a turbine type pumping device mounted upon said supporting structure, provided with means for varying its pumping capacity.

4. Apparatus for the purification treatment of liquids through flocculation of the suspended solids therein, and sedimentation of the resulting flocs in a sludge zone subjacent to a clarified liquid zone, which comprises a tank having overflow means for said clarified liquid, and sludge withdrawal means; a rotary structure turnable about a vertical axis in the body of liquid in the tank, comprising a central vertical hollow member having a top end portion providing communicating flow passage therefrom into the surrounding body of liquid; bearing means supporting said hollow member for rotation about said vertical axis; support structure for said bearing means; sediment conveying means carried by said hollow member for moving sludge over the tank bottom to a sludge collecting zone cooperating with said sludge withdrawal means; sludge recirculating duct means extending outwardly from said hollow member, providing flow passage from at least one predetermined portion of said sludge zone into said hollow member; upflow inducing means effective within said hollow member; closure means for the lower end portion of said hollow member, effective to substantially prevent passage of sludge through said lower end; supply means for feeding liquid to be treated into said hollow member for blending and pre-treating with the recirculating sludge in the presence of a flocculating agent; a baffle wall surrounding said communicating passage, dimensioned and arranged so as to provide therein a supplemental flocculation zone for the pre-treated mixture passing downwardly therethrough into the surrounding body of liquid undergoing sedimentation; flow control means associated with said duct means, operable to regulate and adjust the proportion of sludge being recirculated therethrough; and drive means for rotating said rotary structure.

5. The apparatus according to claim 4, wherein said sludge collecting zone is located adjacent to said hollow member.

6. The apparatus according to claim 4, wherein said flow inducing means is in the form of a turbine type pumping device mounted upon said supporting structure.

7. The apparatus according to claim 4, wherein said duct means comprise a plurality of ducts arranged so as to be effective to recirculate sludge portions from respective different concentric zones.

8. The apparatus according to claim 4, wherein said duct means comprise a plurality of ducts of different lengths and arranged so as to be effective to recirculate sludge portions from respective different concentric zones surrounding one another at the tank bottom.

9. The apparatus according to claim 4, wherein said duct means comprise a plurality of ducts of different lengths and arranged so as to be effective to recirculate sludge portions from respective different concentric zones surrounding one another at the tank bottom, said ducts being arranged in a common vertical plane.

10. The apparatus according to claim 4, wherein said flow control means comprise damper means, and actuating means therefor mounted on said hollow member.

11. The apparatus according to claim 4, wherein said duct means comprise a plurality of ducts arranged so as to be effective to recirculate sludge portions from respective different zones, and wherein said flow control means comprise damper means for each duct and respective individual actuating means therefor mounted on said hollow member.

12. The apparatus according to claim 4, wherein said duct means comprise a plurality of ducts arranged so as to be effective to recirculate sludge portions from respective different concentric zones, wherein each said duct has individually operable flow control devices, and wherein said flow inducing means are turbine type pumping means mounted on said support structure.

13. The apparatus according to claim 4, wherein said flow inducing means is in the form of a turbine type pumping device mounted upon said support structure, wherein the rotor comprises a depending shaft, a circular top plate fixed to the lower end portion of said shaft, and having a diameter substantially smaller than the diameter of the cylindrical member, an annular bottom plate spaced downwardly from and concentric with said top plate, and a plurality of turbine blades rigidly interconnecting said top plate and said bottom plate, and wherein annular baffle means are provided concentric with said rotor, effective between said rotor and said hollow member.

14. The apparatus according to claim 4, wherein said support structure is a column structure rising from the tank bottom within said hollow member.

15. The apparatus according to claim 4, wherein said support structure comprises a plurality of posts rising from the tank bottom within said hollow member.

16. The apparatus according to claim 4, wherein said support structure comprises a plurality of posts rising from said hollow member, with the addition of a bridge construction extending radially of the tank, having its inner end fixed to said support structure.

17. The apparatus according to claim 4, wherein said support structure comprises a plurality of posts rising from the tank bottom within said hollow member, and wherein said closure means comprise a closure plate supported on said posts a distance upwardly from the tank bottom, and having sealing relationship with said hollow member.

18. The apparatus according to claim 4, wherein said feed supply means comprise a conduit leading into said hollow member from the tank bottom, and wherein said upflow inducing means comprise a turbine type pumping device mounted upon said support structure.

19. The apparatus according to claim 4, wherein said support structure comprises a bridge construction diametrically spanning the tank, and wherein said feed supply means comprise a feed conduit leading into said hollow member from the tank bottom, and wherein said closure means comprise a closure plate fixed to the hollow member and having a central opening substantially conforming to said feed conduit and having sealing relationship therewith.

20. The apparatus according to claim 4, wherein said sludge withdrawal means comprise stationary conduit means leading from the sludge collecting zone upwardly within said hollow member.

21. The apparatus according to claim 4, wherein said flow inducing means is in the form of a turbine type pumping device mounted upon said support structure, wherein the rotor comprises a depending shaft, a circular top plate fixed to the lower end portion of said shaft, an annular bottom plate spaced downwardly from and concentric with said top plate, and a plurality of turbine blades rigidly interconnecting said top plate and said bottom plate, wherein said support structure comprises a plurality of posts rising from tank bottom within said hollow member and spaced from one another around said rotor, with the addition of a stationary annular baffle plate mounted on said posts concentric with said rotor and effective between said rotor and said hollow member.

22. The apparatus according to claim 21, wherein the upper end of said hollow member has suspension means comprising a concentric cylindrical top element located above the liquid level in the tank with vertical members rigidly connecting it to the hollow member; wherein said bearing means comprise an annular track mounted on said posts concentric with said hollow member, and presenting a track surface adjacent to said cylindrical top element of the rotary structure, a set of track rollers mounted internally on said cylindrical top element and operating on said track supporting the weight of said rotary structure, and a set of stationary radial guide rollers carried by said posts, internally engaging said cylindrical top element, and wherein said drive means for the rotary structure comprise a rotary drive element located exteriorly of said cylindrical top element in driving relationship therewith.

23. The apparatus according to claim 4, wherein said hollow member has at least one lateral opening located above said recirculating duct means, and wherein said feed supply means comprise a stationary annular inwardly open duct surrounding said hollow member in sealing relationship therewith, and through said lateral opening communicating with the interior of said hollow member.

24. The apparatus according to claim 23, wherein said control means for the recirculating duct means comprise damper means, and actuating leverage therefor, extending at least partially within said hollow member and within the area surrounded by said annular duct.

25. The apparatus according to claim 23, wherein said closure means comprise a closure plate supported a distance upwardly from the tank bottom, and wherein said sludge withdrawal means comprise a stationary pipe extending from the sludge collecting zone through said closure plate upwardly and within said hollow member.

26. The apparatus according to claim 25, wherein said stationary sludge withdrawal pipe extends centrally through said plate.

27. The apparatus according to claim 23, wherein said closure means comprise an annular sealing device effective between the tank bottom and the lower end of said hollow member.

28. The apparatus according to claim 23, wherein said closure means comprise a closure plate supported a distance upwardly from the tank bottom, wherein said sludge collecting means comprise an annular sump, and wherein said sludge withdrawal means comprise a stationary pipe extending upwardly through said plate and within said hollow member, said pipe having at least one terminal portion extending to said sump.

29. The apparatus according to claim 23, wherein said closure means comprise a closure plate supported a distance upwardly from the tank bottom, wherein said sludge collecting means comprise a central sump below said hollow member, and wherein said sludge withdrawal means comprise a stationary pipe extending from said sump upwardly through said plate and within said hollow member.

30. The apparatus according to claim 29, wherein said pipe extends centrally through said plate.

31. Apparatus for the purification treatment of liquids through flocculation of the suspended solids therein, and sedimentation of the resulting flocs in a sludge zone subjacent to a clarified liquid zone, which comprises a tank having overflow means for said clarified liquid, and sludge withdrawal means; a rotary structure turnable about a vertical axis in the body of liquid in the tank, comprising a central vertical hollow member having a top end portion providing communicating flow passage into the surrounding body of liquid; bearing means supporting said hollow member for rotation about said vertical axis; support structure for said bearing means; a plurality of sludge recirculating ducts embodied in a box girder construction extending radially from said hollow member, comprising a pair of parallel side walls having a vertical edge extending along said hollow member, and having a substantially horizontal bottom edge, said box girder construction being partitioned into a plurality of inclined parallel ducts of substantially rectangular cross-section, one above the other, and so constructed and arranged that the bottom intake openings of said ducts are located adjacent to respective concentric zones of the tank bottom; sludge conveying blade means fixed to said box girder construction across said intake openings; upflowing inducing means effective within said cylindrical member; closure means provided at the lower end of said cylindrical member, effective to substantially prevent passage of sludge through said lower end into said cylindrical member; supply means for feeding liquid to be treated into said cylindrical member for blending and pretreating with the recirculating sludge in the presence of a flocculating agent; a baffle wall surrounding said communicating passage, dimensioned and arranged so as to provide therein a supplemental flocculation zone for the pre-treated mixture passing downwardly therethrough; individual flow control means associated with respective recirculating ducts, individually operable to regulate and adjust the proportion of sludge being recirculated from the respective concentric bottom zones; and drive means for rotating said rotary structure.

32. The apparatus according to claim 31, wherein said support structure comprises a bridge construction extending diametrically across the tank.

33. The apparatus according to claim 31, wherein said upflow inducing means is a turbine type pumping device mounted upon said support structure.

34. The apparatus according to claim 33, wherein said support structure comprises a plurality of posts located within said rotary cylindrical member.

35. Apparatus for the purification treatment of liquids through flocculation of the suspended solids therein, and sedimentation of the resulting flocs in a sludge zone subjacent to a clarified liquid zone, which comprises a tank having overflow means for said clarified liquid, and sludge withdrawal means; a rotary structure turnable about a vertical axis, comprising a central vertical cylindrical member having a top end portion providing communicating flow passage therefrom into the surrounding body of liquid; bearing means supporting said cylindrical member for rotation about said vertical axis; support structure for said bearing means; at least one rake arm extending from the lower end of said cylindrical member, and carrying a set of sludge conveying blades arranged in pairs of V-shaped formation so as to constitute along said arm a row of sludge collecting pockets; a plurality of separate recirculating ducts extending radially outwardly from said cylindrical member substantially in a common vertical plane, and having their open ends terminate in the narrow end of respective pockets, whereby sludge may be recirculated from respective concentric bottom zones; upflow inducing means effective within said cylindrical member; closure means at the lower end portion of said cylindrical member for substantially preventing passage of sludge from the sludge zone through said end portion into said cylindrical member; supply means for feeding liquid to be treated into said cylindrical member for blending and pre-treating with the recirculating sludge, in the presence of a flocculating agent; a baffle wall surrounding said communicating passage, dimensioned and arranged so as to provide therein a supplemental flocculation zone for the pre-treated mixture passing downwardly therethrough; individual flow control means associated with respective recirculating ducts, and individually operable to regulate and adjust the proportions of sludge being recirculated from the respective concentric bottom zones; and drive means for rotating said rotary structure.

36. The apparatus according to claim 35, wherein said upflow inducing means is a turbine type pumping device mounted upon said support structure.

37. The apparatus according to claim 36, wherein said support structure comprise a plurality of posts located within said cylindrical member.

38. The apparatus according to claim 36, wherein said support structure comprises a bridge construction extending diametrically across the tank.

39. Apparatus for the purification of liquids through flocculation of the suspended solids therein, and sedimentation of the resulting flocs in a sludge zone subjacent to a clarified liquid zone, which comprises a tank having overflow means for said clarified liquid, and sludge withdrawal means; a rotary structure turnable about a vertical axis in the body of liquid in the tank, comprising a central vertical hollow member having a top end portion providing communicating flow passage therefrom into the surrounding body of liquid; bearing means supporting said hollow member for rotation about said vertical axis; support structure for said bearing means; sediment conveying means carried by said hollow member for moving sludge over the tank bottom to a sludge collection zone cooperating with said sludge withdrawal means; a plurality of sludge recirculating ducts extending from said hollow member, providing flow passages from respective concentric portions of the sludge zone into said hollow member; a turbine type pumping device mounted on said support structure, comprising a rotor substantially concentric with said hollow member, and effective to maintain upflow in said hollow member; closure means for the lower end portion of said hollow member, effective to substantially prevent passage of sludge through said lower end; supply means for feeding liquid to be treated into said hollow member for blending and pre-treating with the recirculating sludge in the presence of a flocculating agent; a baffle wall surrounding said communicating passage, dimensioned and arranged so as to provide therein a supplemental flocculation zone for the pre-treated mixture passing downwardly therethrough into the surrounding body of liquid undergoing sedimentation; individually operable flow control means provided for the respective ducts; first control means for varying the turbine capacity comprising devices for varying the rotor speed; second control means for varying the turbine capacity comprising devices for increasing or decreasing the degree of effectiveness of the turbine blades; and drive means for rotating said rotary structure.

40. The method of subjecting a flow of liquid to flocculation of the suspended solids therein, and sedimentation of the resulting flocs in a sludge zone subjacent to a clarifier liquid zone in a tank having means for sludge withdrawal and clarified liquid overflow, which method comprises maintaining said tank a vertical upflow zone communicating at the top with the surrounding body of liquid; continuously moving sludge over the tank bottom towards a sludge collecting zone adjacent to said upflow zone, but functionally separate therefrom; continuously feeding liquid to be treated into said upflow zone while imparting upflow energy to said zone; continuously recirculating sludge containing a significant proportion of incompletely developed flocs from concentric portions of the sludge zone along separate paths into said upflow zone for blending with said feed liquid in the presence of a flocculating agent, thereby effecting solids coagulation and the formation and growth of flocs in a contact- and reaction zone due to the interaction of said solids, said flocs, and said flocculating agent, and delivering a thus pre-treated mixture from the top of said upflow zone; controlling the flow rates along said separate paths so as to maintain in said upflow zone optimum concentration of optimum sized incompletely developed flocs having a high growth potential; maintaining around the upper portion of said upflow zone an annular downflow zone effective to encourage further growth of flocs in the pre-treated mixture; and delivering the floc-laden liquid into the body of liquid undergoing sedimentation while allowing fully developed floc structures to descend substantially directly into said sludge collecting zone for withdrawal therefrom.

41. The method according to claim 40, wherein the recirculation control is such that the volume of sludge being recirculated is in a range from about two times to about five times the volume of the feed liquid.

42. The method according to claim 40, wherein the volume of recirculation through the respective ducts is controlled so as to maintain in said contact- and reaction upflow zone a solids concentration in a range from about 2 percent to about 5 percent, and to maintain a flow velocity in said upflow zone in a range from about 2 ft./sec. to about 5 ft./sec.

References Cited

UNITED STATES PATENTS

| 2,506,927 | 5/1950 | Kelly | 210—197 |
| 2,669,357 | 2/1954 | Kivall et al. | 210—197 |

FOREIGN PATENTS 489,452    7/1938    Great Britain.

MORRIS O. WOLK, *Primary Examiner.*

M. E. ROGERS, *Assistant Examiner.*